(12) United States Patent
Isgar

(10) Patent No.: US 12,340,693 B2
(45) Date of Patent: *Jun. 24, 2025

(54) AREA RESERVATION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,344

(22) Filed: May 13, 2024

(65) Prior Publication Data

US 2024/0296740 A1 Sep. 5, 2024

Related U.S. Application Data

(63) Continuation of application No. 17/532,288, filed on Nov. 22, 2021, now Pat. No. 11,984,032, which is a continuation of application No. 16/903,014, filed on Jun. 16, 2020, now Pat. No. 11,183,064.

(60) Provisional application No. 62/870,454, filed on Jul. 3, 2019.

(51) Int. Cl.
| | |
|---|---|
| *G06Q 10/02* | (2012.01) |
| *G08G 1/14* | (2006.01) |
| *H04W 4/021* | (2018.01) |
| *H04W 4/024* | (2018.01) |

(52) U.S. Cl.
CPC ............ *G08G 1/146* (2013.01); *G06Q 10/02* (2013.01); *G08G 1/148* (2013.01); *H04W 4/021* (2013.01); *H04W 4/024* (2018.02)

(58) Field of Classification Search
None
See application file for complete search history.

(56) References Cited

U.S. PATENT DOCUMENTS

| | | | |
|---|---|---|---|
| 7,956,769 B1 | 6/2011 | Pearl | |
| 9,838,843 B1 * | 12/2017 | Bajaj | H04W 4/022 |
| 10,902,439 B2 | 1/2021 | Holman et al. | |
| 11,145,016 B1 | 10/2021 | Brophy | |
| 2013/0339255 A1 | 12/2013 | Talbird et al. | |
| 2015/0317586 A1 | 11/2015 | Kassman | |
| 2015/0369618 A1 * | 12/2015 | Barnard | H04W 4/70 701/491 |
| 2016/0357768 A1 * | 12/2016 | Strong | G06F 16/29 |
| 2017/0351975 A1 | 12/2017 | Webb | |
| 2018/0057262 A1 | 3/2018 | Mitsuyu et al. | |
| 2019/0066502 A1 | 2/2019 | Du et al. | |
| 2020/0410623 A1 * | 12/2020 | Vahabzadeh | G06Q 10/02 |

* cited by examiner

*Primary Examiner* — John F Mortell
(74) *Attorney, Agent, or Firm* — Schmeiser, Olsen & Watts LLP

(57) ABSTRACT

Described is an area reservation system. The system includes a server having a memory storing area information and a user computing device coupled to the server. The server may be programmed to receive and process a signal that the user computing device has accessed the system and is searching for an area to reserve at a user selected location and time; send for display, on the user computing device, area information including available areas to reserve; automatically reserve an area in response to receiving user input requesting reservation of the area; establish a geofence around the reserved area; and send a notification to the user computing device in response to the user computing device entering the geofence of the reserved area.

3 Claims, 16 Drawing Sheets

AREA RESERVATION SYSTEM

CROSS REFERENCE TO RELATED APPLICATION

This application is a continuation of U.S. patent application Ser. No. 17/532,288, filed Nov. 22, 2021, which is a continuation of U.S. patent application Ser. No. 16/903,014, filed Jun. 16, 2020, which claims priority to U.S. Provisional Patent Application Ser. No. 62/870,454, filed Jul. 3, 2019, now pending, the disclosure of which is hereby incorporated entirely herein by reference.

BACKGROUND OF THE INVENTION

Technical Field

This invention generally relates to a system for reserving a spot, and more specifically to a system for reserving a spot utilizing a geofence.

State of the Art

There are several instances where an individual or business entity would desire to save a certain area or spot for use. This can be a tailgate location before a big game, seating at a venue, a location to watch a parade, an area to watch fireworks and the like. Current systems of reserving spots or areas include arriving early and marking off your territory for the event you are attending. This is time consuming and inefficient. There is not currently a system that allows for the reservation of an area and having that area reserved based on geofence technology.

Accordingly, what is needed is a system for reserving an area for use by at least one individual utilizing geofence or other proximity technology allowing for reservation of an area without the need to show up early and manually reserve the area.

SUMMARY OF THE INVENTION

An embodiment includes an area reservation system comprising: a server having a memory storing area information; and a user computing device coupled to the server, wherein the server is programmed to: receive and process a signal that the user computing device has accessed the system and is searching for an area to reserve at a user selected location and time; send for display area information including available areas to reserve; automatically reserve an area in response to receiving user input requesting reservation of the area; establish a geofence around the reserved area; and send a notification to the user computing device in response to the user computing device entering the geofence of the reserved area.

In embodiments, the server may be further programmed to generate navigation direction to the reserved area and send the navigation direction for display and operation on the user computing device. Additionally, the server may be further programmed to send a notification to the user computing device in response to the user computing device being within a predetermined distance of a geofence of a reserved area of another user, wherein the notification is an alert on the user computing device that the user computing device is approaching the area reserved by another user.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to an area reservation system for reserving a spot, and more specifically to a system for reserving a spot utilizing a geofence. The system may include the use of a mobile application operating on a user computing device that may be a mobile computing device like a smartphone, a tablet, a wearable, and the like; and/or the system may operate on any type of computing device as a downloadable application or even as a web application.

Figure 1:
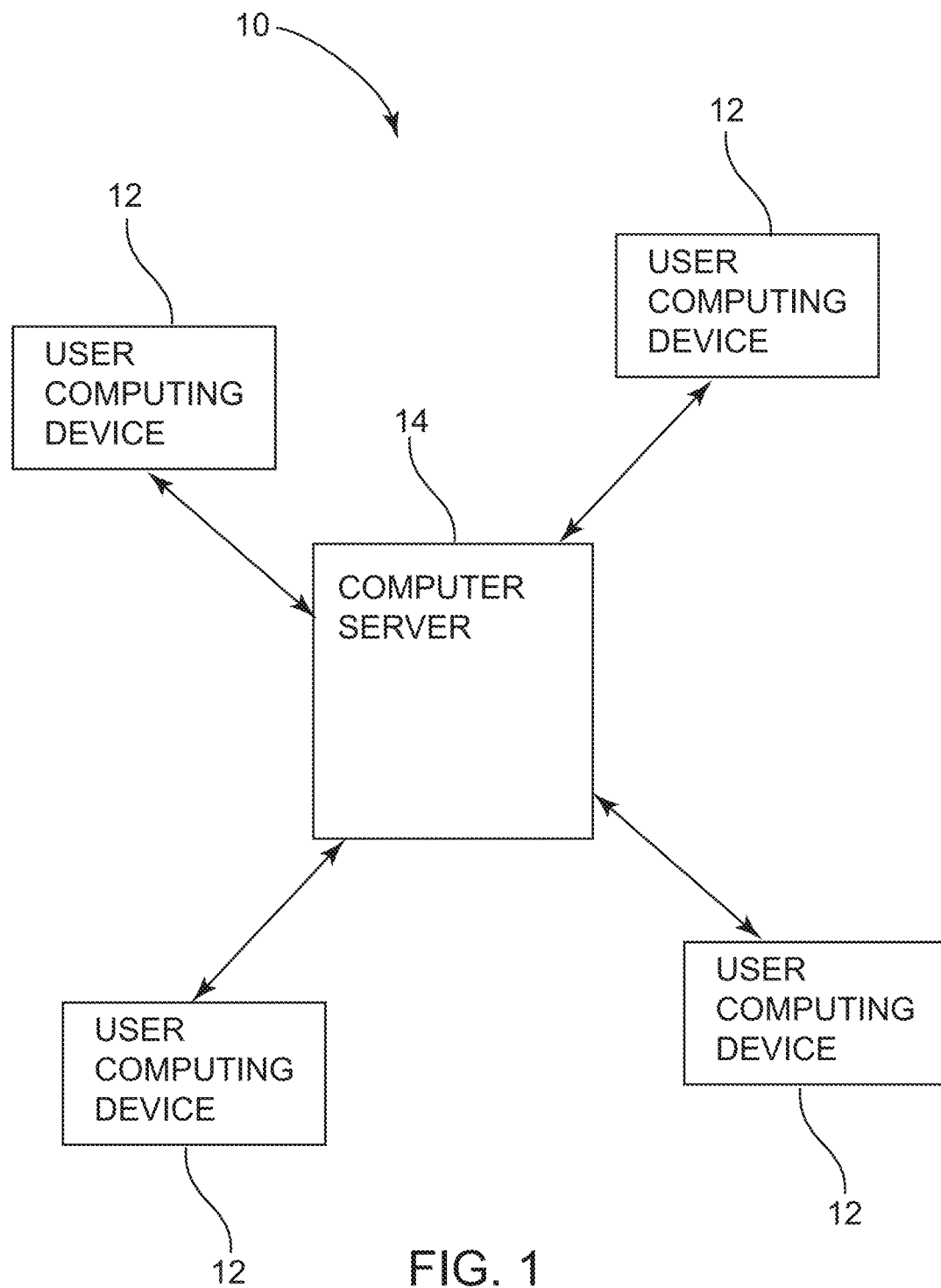
FIG. 1 a diagrammatic view of an area reservation system according to an embodiment.

FIG. 1 depicts an embodiment of an area reservation system 10. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, wearable devices and the like. The server 14, in some embodiments, may be a computer server or a cloud-based infrastructure architecture.

The server 14 may include a memory storing various data. The memory of the server 14 may store user information, such as demographic information, and may further store area information that may be reserved. The area information may include a geographic area, such as, but not limited to, a portion of a parking lot, a grass area at a park, a seat at a venue, a location along a street and the like.

Figure 2:
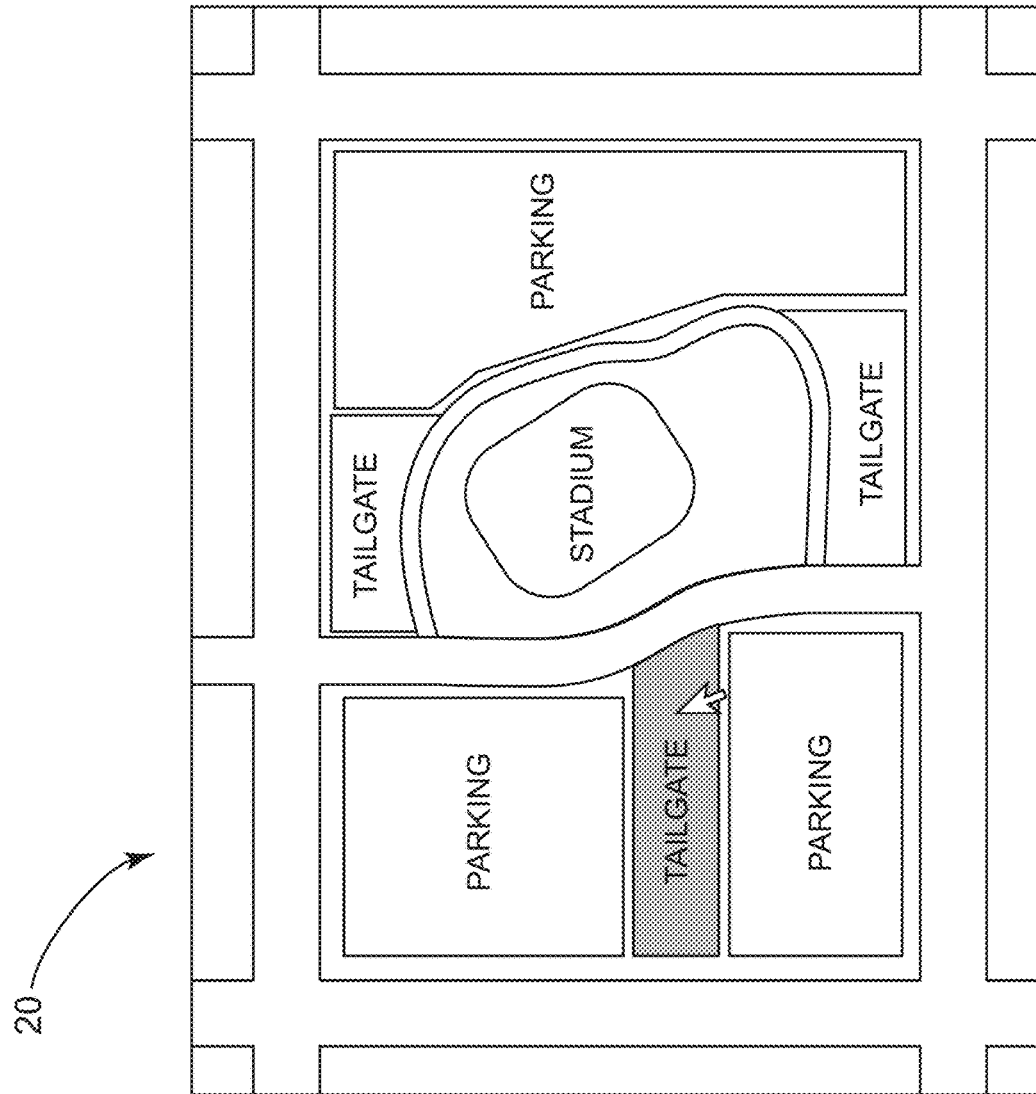
FIG. 2 is a user interface for interaction with an area reservation system with an area selected according to an embodiment.
Figure 3:
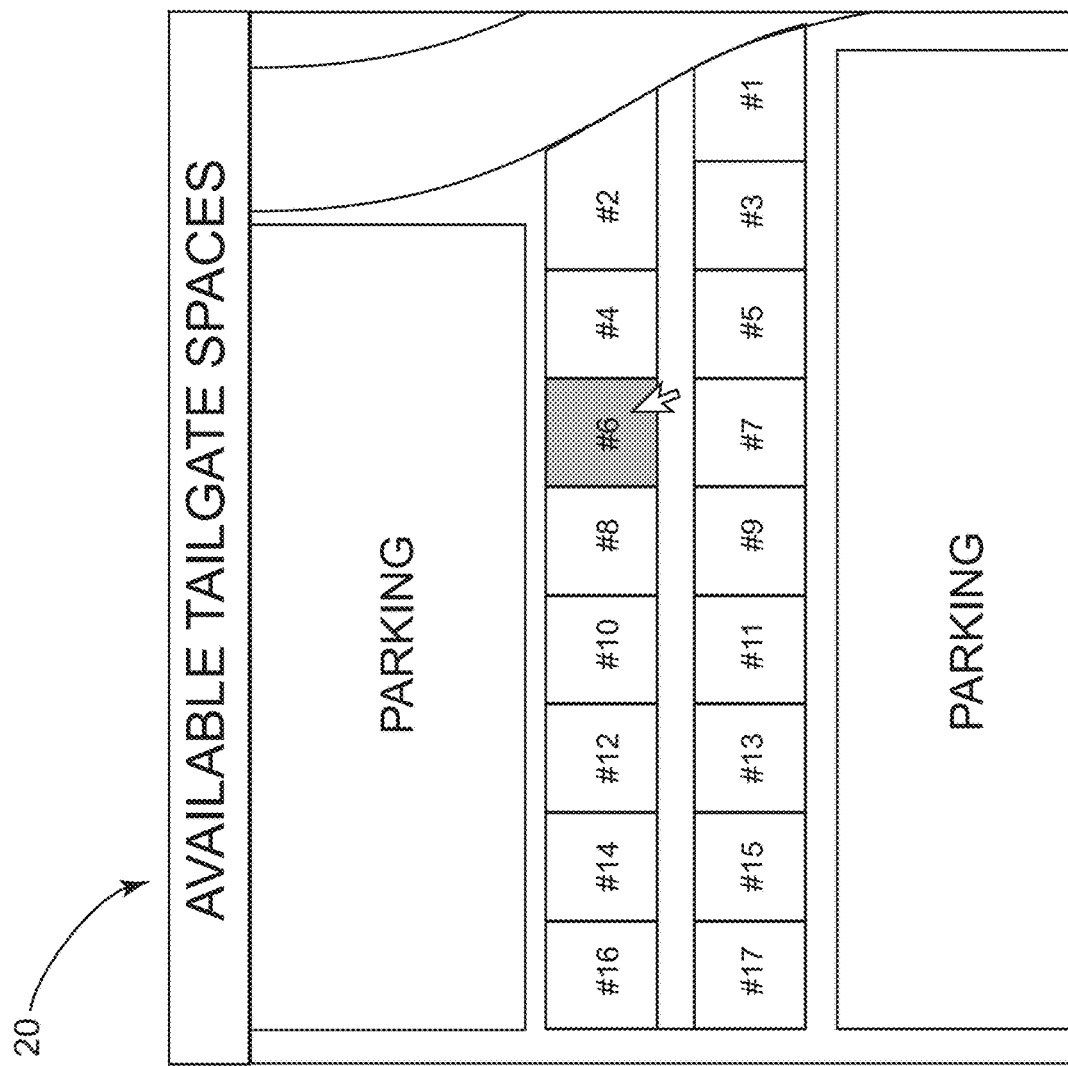
FIG. 3 is a user interface for interaction with an area reservation system with zoomed in view showing sub areas within the area selected in FIG. 2 according to an embodiment.
Figure 4:
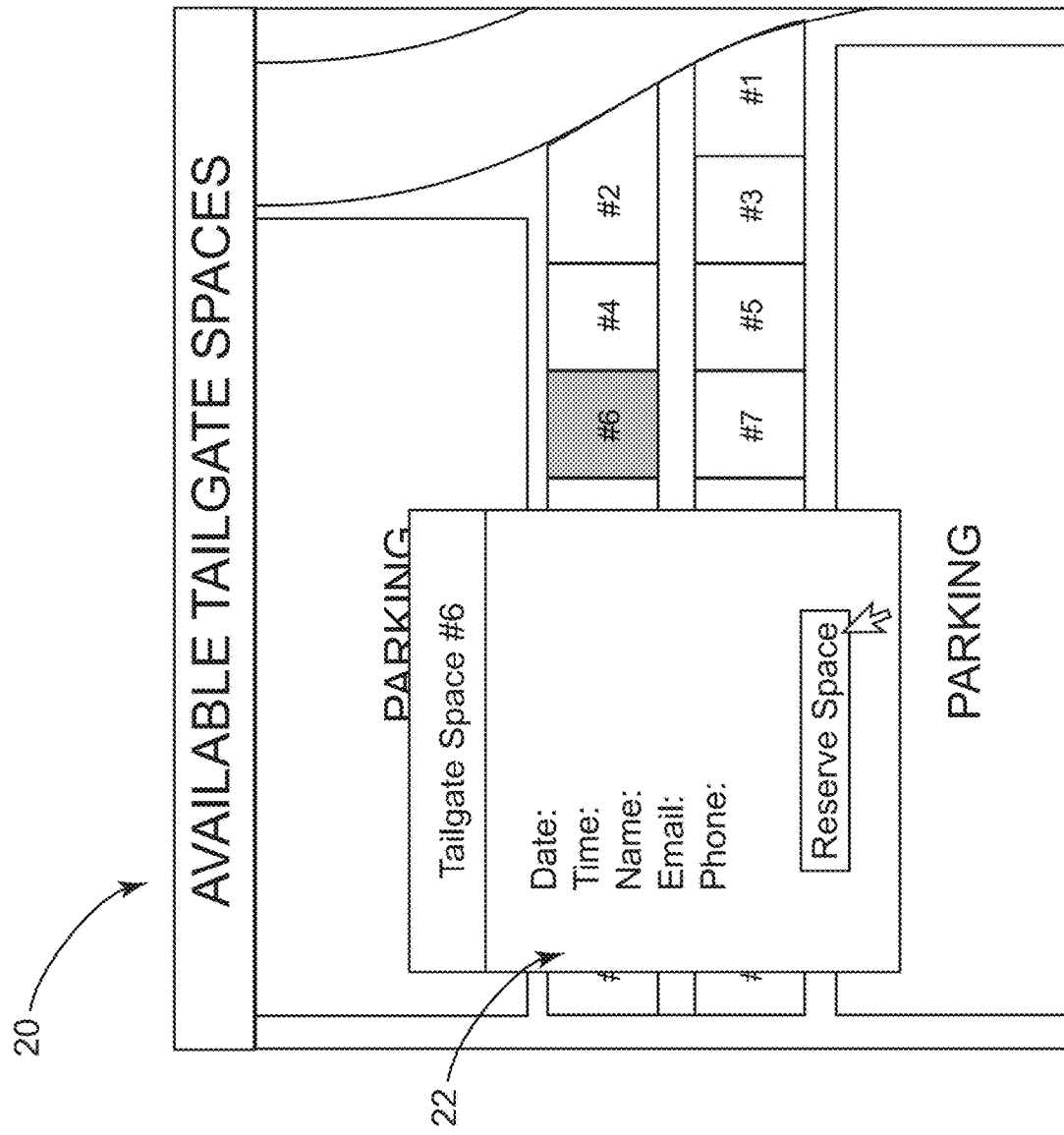
FIG. 4 is a user interface for interaction with an area reservation system with a reservation interface corresponding to the sub-area selected in FIG. 3 according to an embodiment.

The user computing device 12 may be coupled to the server 14, and, referring to FIGS. 2-4, the server 14 may be programmed to receive a signal that a user computing device 12 has accessed the system 10 such as by running the area reservation app on the user computing device 12. The server 14 may then be programmed to deliver area information to the user computing device for display as a user interface, such as user interface 20 depicted in FIG. 2. For example, the area information may include a map of a desired area that the user wishes to reserve. The server may be programmed to provide an interactive map with certain areas that may be reserved (such as the areas designated at "Tailgate" in FIG. 2, for example and without limitation). The user may select an area. In embodiments, the user interface may highlight the selected area. The server 14 may then send for display on the user computing device 12, the interface 20 with a zoomed in map of the selected area, as shown in FIG. 3. The zoomed in map may include available spaces or areas that can be reserved, such as, but not limited to spaces 1-17 of FIG. 3. A user may select one of the available spaces or areas. The selection of an area on the user interface 20 may then be processed by the server 14 and the server 14 may send for display on the user computing device 12, a reservation interface 22, wherein the user may enter information necessary for reserving the area.

Figure 16:
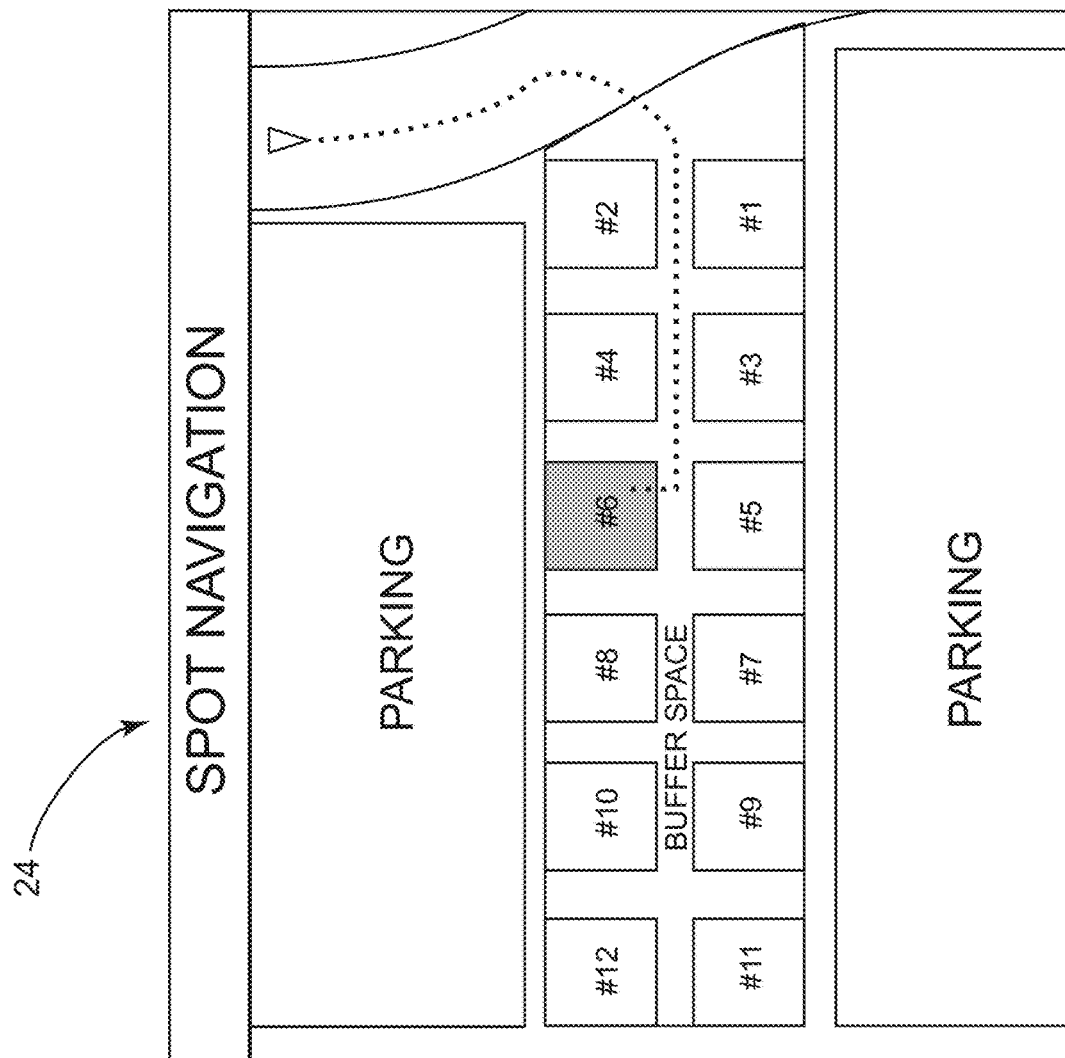
FIG. 16 is a user interface for interaction with an area reservation system showing navigation to a reserved space according to an embodiment.

The system may then allow a user to later go the reserved area, and area information may be used by the system 10 to direct the user with the user computing device 12 to the proper area. In such embodiments, the user computing device 12 may include a global positioning system device ("GPS device") as part of the user computing device 12 (such as, but not limited to a smartphone). The GPS device may be utilized by the user computing device 12 operating an area reservation app to determine the location of the user computing device 12 and send the same to the server 14. The server 14 may then send directions for reaching the reserved area, such as navigation interface 24 depicted in FIG. 16. Additionally, a geofence may be established by the server with regard to the reserved area, such that when the user is approaching the reserved area, the server 14 may send notifications to the user computing device 12 that the user computing device is near the reserved area. The system 10 may also send a notification once the user computing device 12 enters the geofence of the reserved area and the user computing device 12 will alert a user that he or she is in the correct place. The user may share the location with others and they may utilize their user computing devices 12 to find the reserved area.

Figure 5:
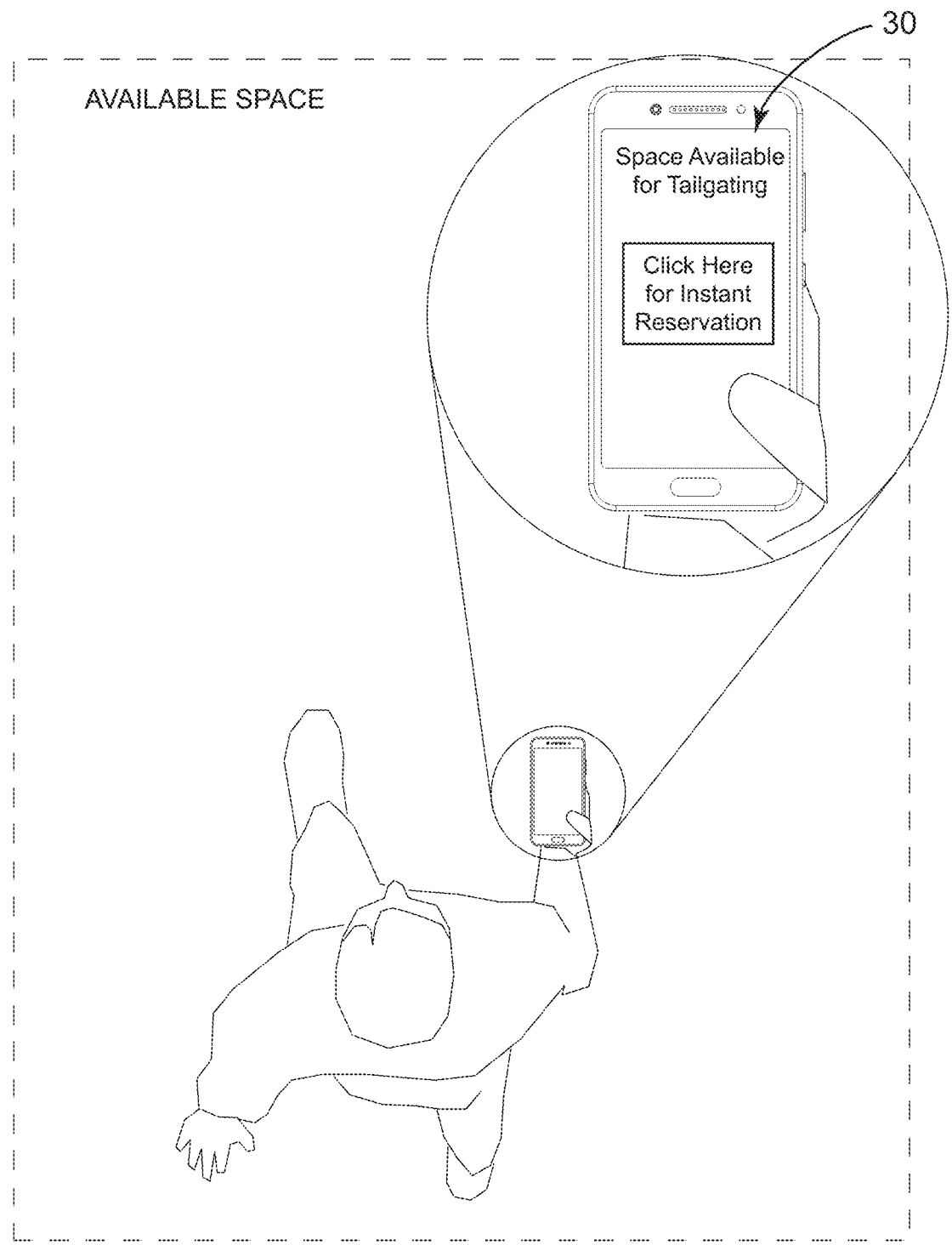
FIG. 5 depicts a user computing device entering an available space while operating an area reservation system according to an embodiment.

Referring to FIG. 5, as a user may be in an event or the like where areas may be available for instant reservation. As the user is walking through such an area with the user computing device 12 running the area reservation app, the user computing device may send location information of the user computing device to the server 14. The server 14 may be programmed to send a notification 30 for display to the user computing device 12 that the user computing device has entered a geofenced area for an available area for reservation. The server 14 may then send for display an interface that allows a user to instantly reserve the geofenced area that the user computing device is within.

Figure 6:
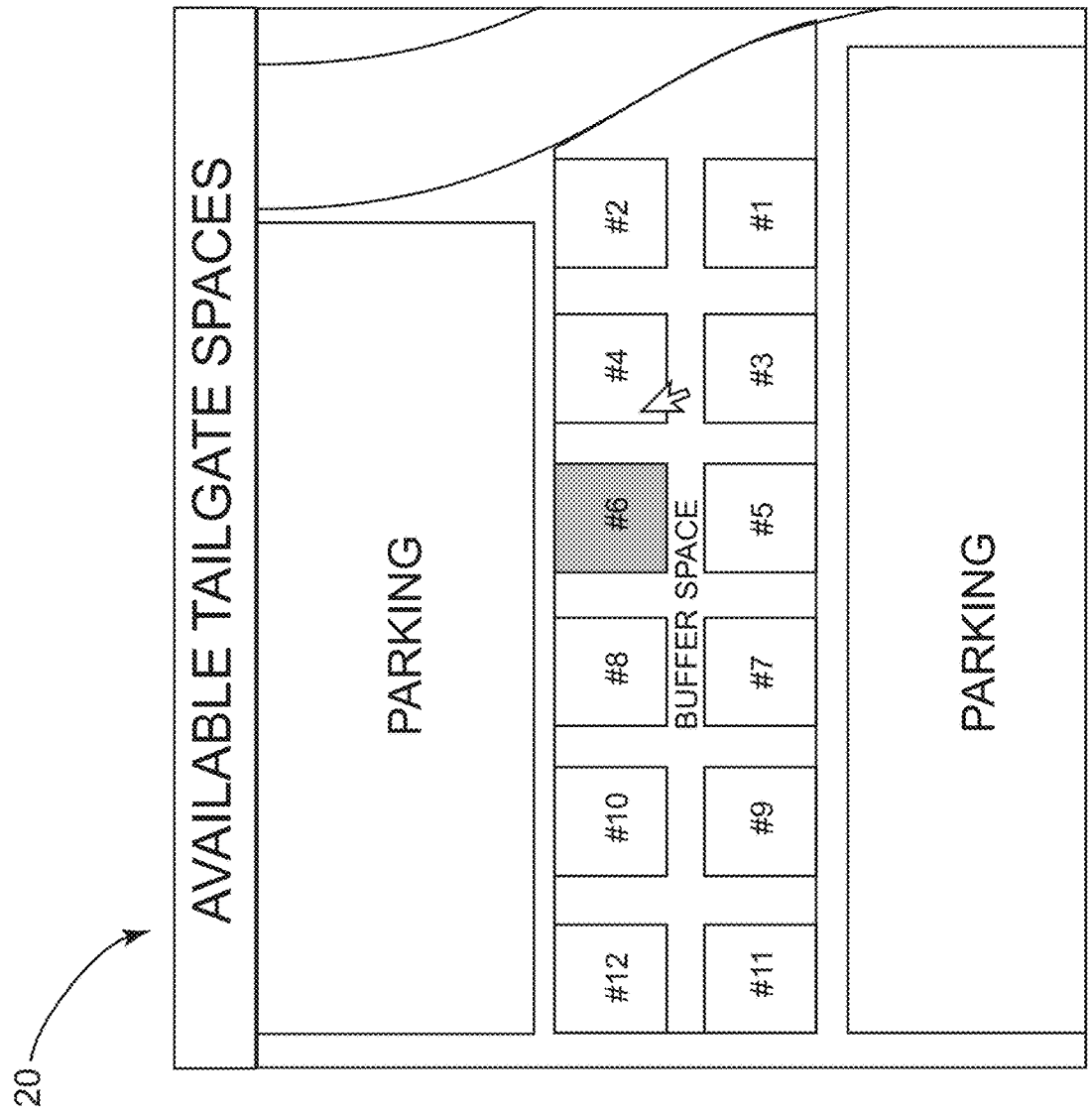
FIG. 6 is a user interface for interaction with an area reservation system with spaced apart available areas with an area selected according to an embodiment.

In some embodiments, as depicted in FIG. 6, there may be a need to have social distancing between spaces that are to be reserved and the system 10 may depict on user interface 20 the spaces available with buffer space between each of the available spaces or areas that can be reserved. The user may then reserve a space in the same manner as discussed above with regard to FIGS. 2-4.

The system may then allow a user to later go the reserved area, and area information may be used by the system 10 to direct the user with the user computing device 12 to the proper area. In these embodiments, the user computing device 12 may include a global positioning system device ("GPS device") as part of the user computing device 12 (such as, but not limited to a smartphone). The GPS device may be utilized by the user computing device 12 operating an area reservation app to determine the location of the user computing device 12 and send the same to the server 14. The server 14 may then send directions for reaching the reserved area, such as navigation interface 24 depicted in FIG. 16. This navigation functionality may be present in any use of the system 10 for reserving any type of space or area. Additionally, a geofence may be established by the server with regard to the reserved area, such that when the user is approaching the reserved area, the server 14 may send notifications to the user computing device 12 that the user computing device is near the reserved area. The system 10 may also send a notification 30 once the user computing device 12 enters the geofence of the reserved area and the user computing device 12 will alert a user that he or she is in the correct place. The user may share the location with others and they may utilize their user computing devices 12 to find the reserved area.

Figure 7:
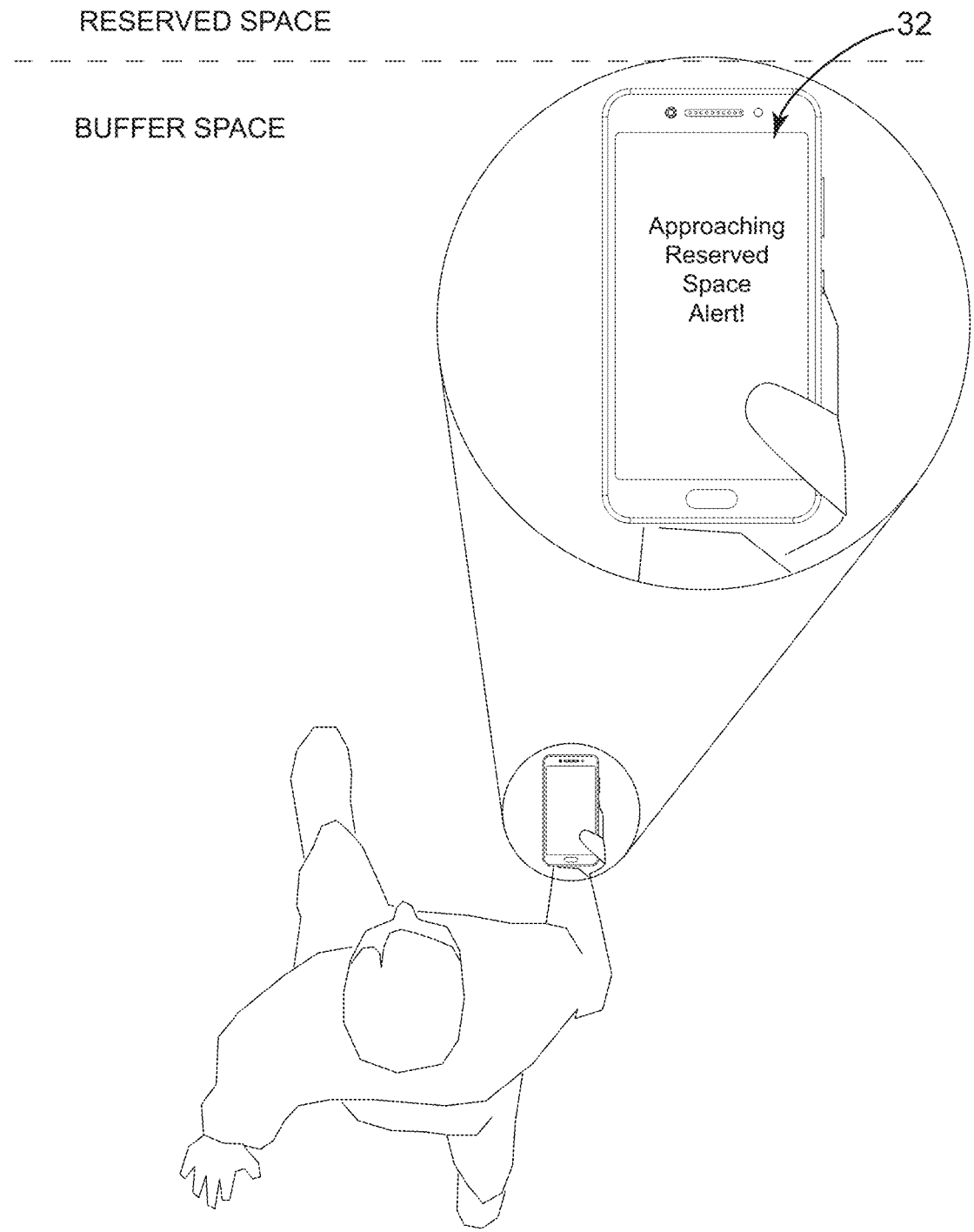
FIG. 7 depicts a user computing device providing an alert while approaching a reserved space while operating an area reservation system according to an embodiment.

Further, in some embodiments, particularly where social distancing is desired, the system, as depicted in FIG. 7 may include an alert system that alerts the user through the user computing device 12 that the user is approaching a reserved space or area while the user computing device is within a predetermined distance from a reserved space that is not the reserved space of the user. The server 14 is programmed to use the same location and geofence technology that alerts the user when she reaches her area to be used to alert someone, such as alert interface 32, who is approaching a reserved area that is not the area reserved by the user. This allows a user to navigate to his or her reserved space while maintaining social distancing, such as remaining in the buffer space until he or she reaches his or her reserved area.

Figure 8:
FIG. 8 is a computing device depicting a monitoring of spaces in an area with use of an area reservation system according to an embodiment.

In embodiments, as shown in FIG. 8, the system 10 may include a monitoring interface 40 that allows a system administrator to monitor the reservations and available spaces.

This system 10 may be utilized in other instances such as real-time update or change of location once at a venue or event. This may be open tables with a better view, or a bigger table that can be reserved once within the restaurant, or may be in a venue wherein seats within a proximity of the user are available and the system providing an interface for users to upgrade or change his or her seat locations. It may be utilized for fishing spots, camping spots, beach spots, for trailer locations, for RV parks, ramadas at a park, cabanas, boat docking slips, parking lots, rallies and anything with fluctuating demand.

Figure 9:
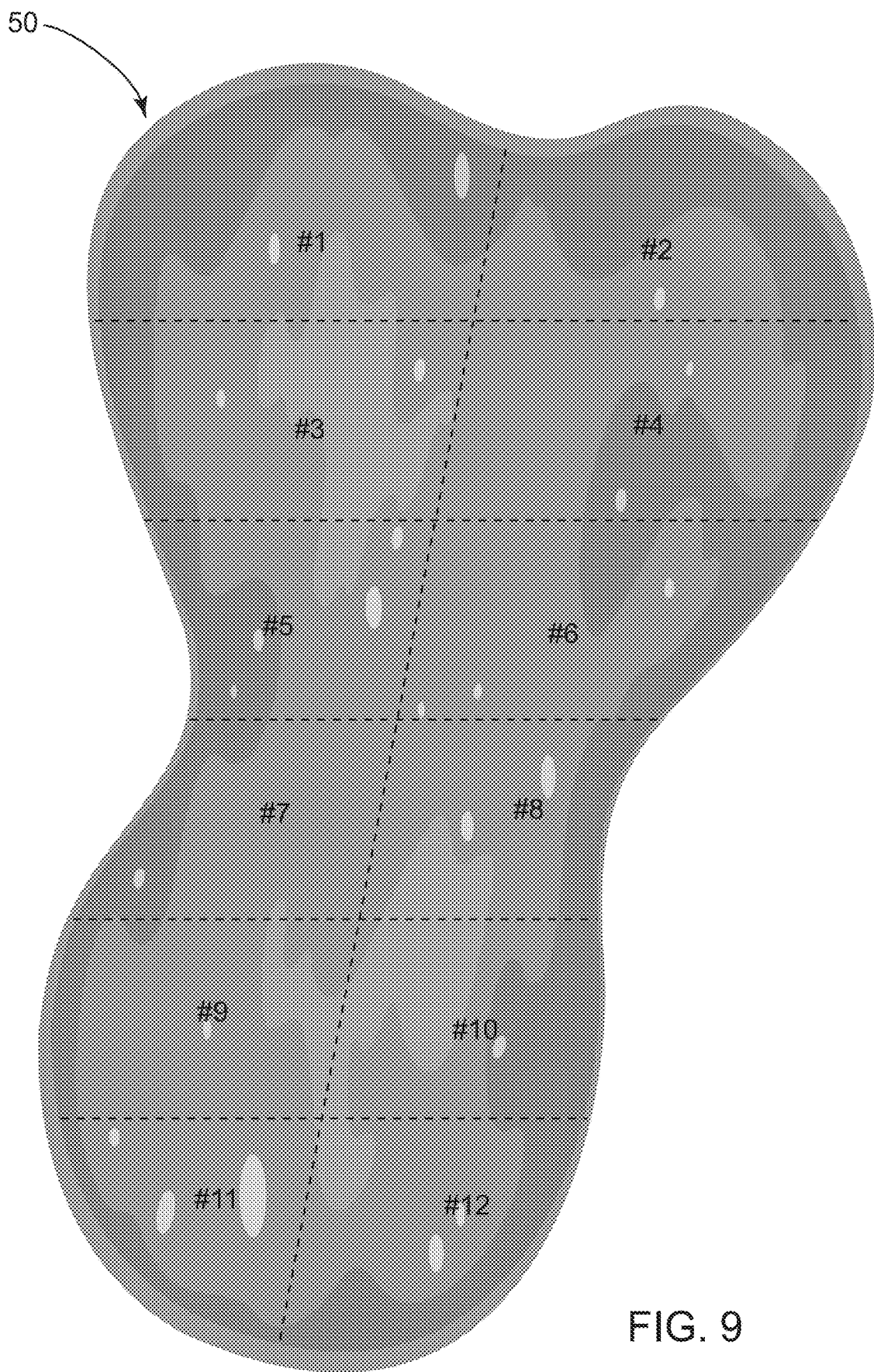
FIG. 9 is a user interface for interaction with an area reservation system for use with fishing spots on a lake according to an embodiment.
Figure 10:
FIG. 10 depicts use of the area reservation system for use with fishing spots according to an embodiment.
Figure 11:
FIG. 11 depicts use of the area reservation system for use with beach spots according to an embodiment.
Figure 12:
FIG. 12 depicts use of the area reservation system for use with a farmer's market according to an embodiment.
Figure 13:
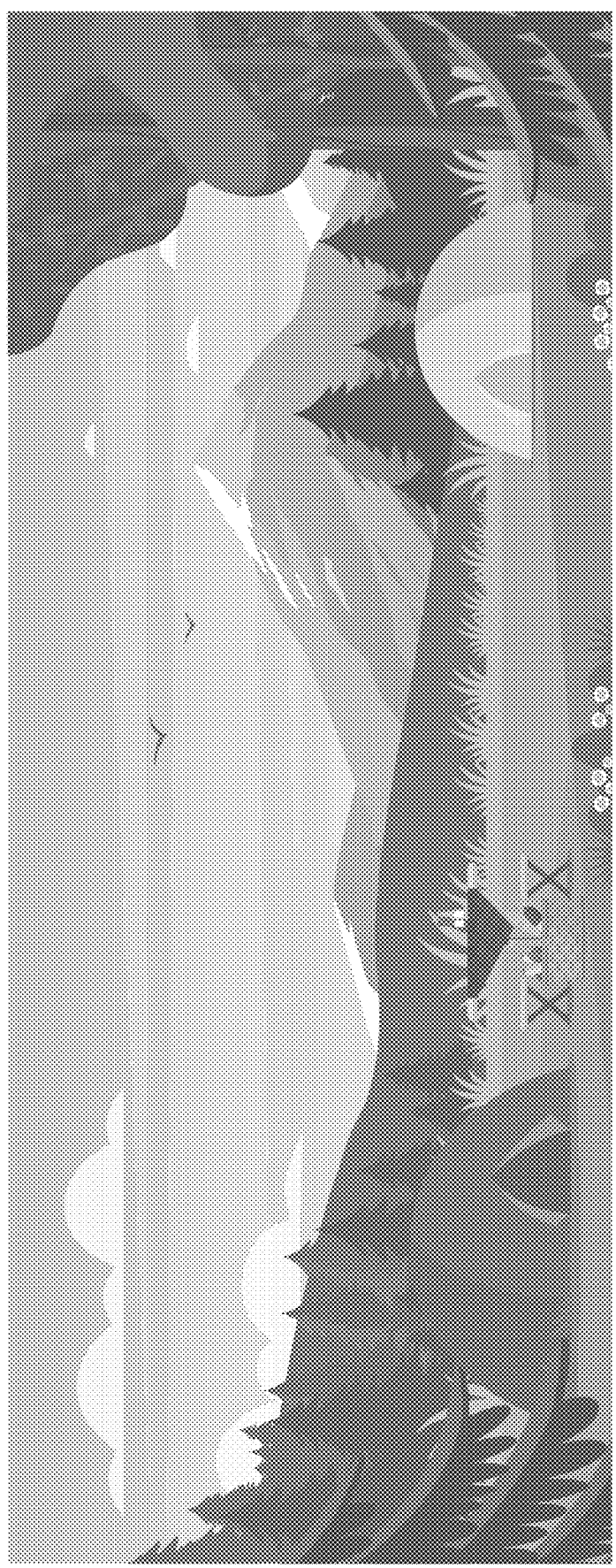
FIG. 13 depicts use of the area reservation system for use with camping spots according to an embodiment.

By way of example of some of the types of areas for which the system may be utilized, FIGS. 9-13 provide such examples. FIG. 9 depicts a lake interface 50 separated into various fishing areas or zones and may be accessed through a user computing device 12, the user may select the fishing area desired and reserve the area using the system in the same manner as described with regard to FIGS. 2-4. FIG. 10 depicts various users on a lake fishing in the individual reserved areas on the lake. FIG. 11 depicts the use of the system 10 with regard to beach spots. FIG. 12 depicts use of the system 12 to reserve spots in a farmer's market or the like. FIG. 13 depicts the use of the system 10 for camping spots.

Figure 14:
FIG. 14 is a user interface for interaction with an area reservation system for use with parking lots according to an embodiment.

FIG. 14 depicts a user interface 60 for using system 10 to identify parking lot locations and available parking. The user interface depicts parking lots that are part of the system 10. The user may select a parking lot that is desired, and the system will report the number of available spaces within that parking lot. The user may reserve a parking space in that parking lot. Such reservation may not be for a particular space within the lot, but for any available space within the parking lot. The server 14 may then be programmed to hold a spot available for the user for a predetermined period of time to allow the user to travel to the parking spot or hold it for a window of time around a selected time of reservation of a parking spot. The reservation may occur in a manner that is similar to what is described with regard to FIGS. 2-4. The navigation may direct the user to the reserved parking space. Once the user gets to the parking lot, the native systems for managing the parking lot may be used and communicate with the server to confirm that the user has entered the parking lot and also confirm when the vehicle leaves the parking lot. Other ways of confirming may also be utilized.

Figure 15:
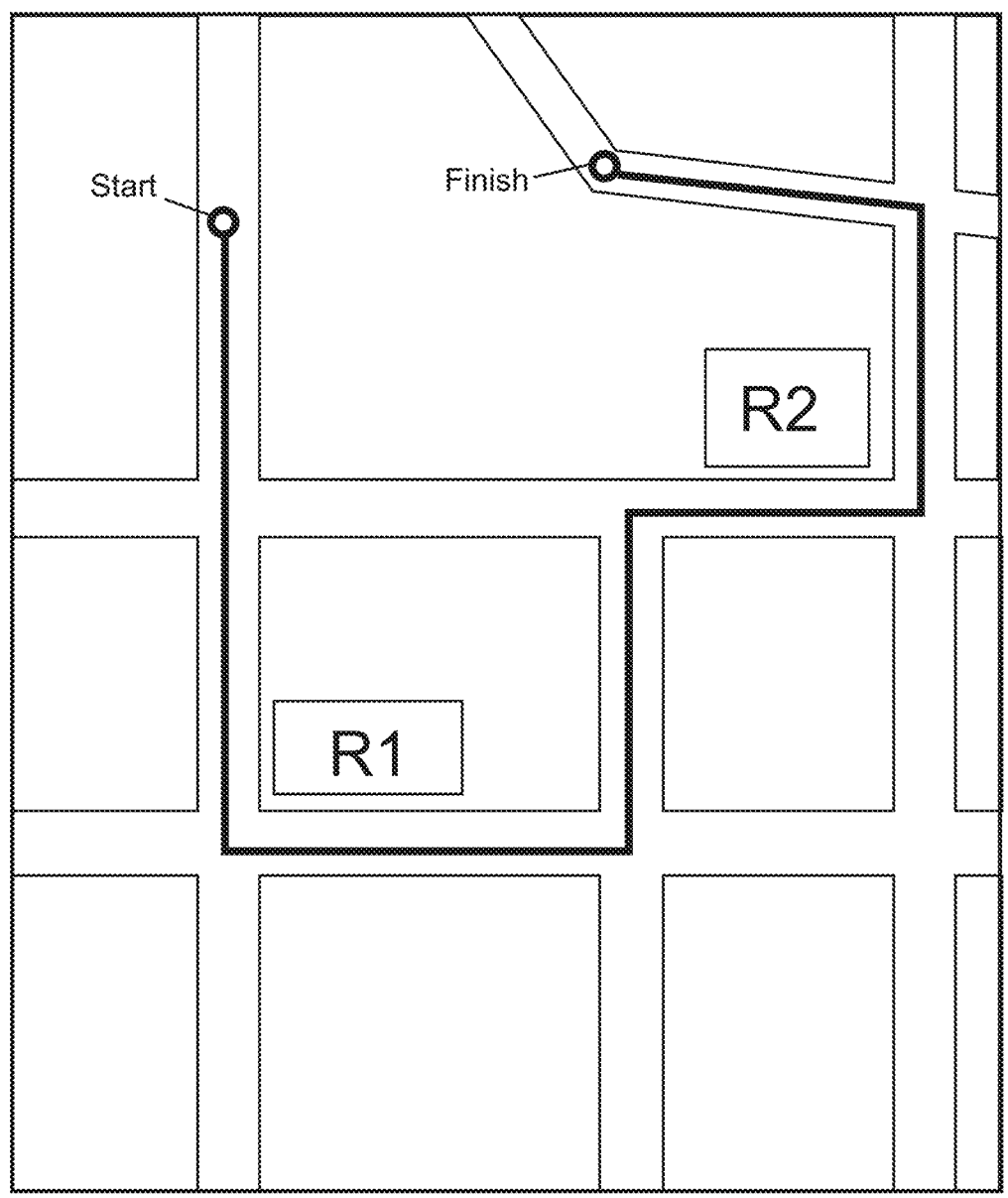
FIG. 15 is a user interface for interaction with an area reservation system for use in a rally according to an embodiment.

FIG. 15 depicts a user interface 70 of the system 10 with a rally, such as a 5K run/walk charity rally. The system 10 may allow volunteers and organizers to identify what human and other resources are needed at various locations of the rally, such as location R1 or R2, depicted as locations along a 5 k running route. The selection of a location may result in the server 14 being programmed to send for display on the user computing device 12 the needed resources, such as number of people needed, water needed, etc. The user may then reserve the spot, such as by sending 2 volunteers to the selected area and the system 10 can update. This allows organizers and volunteers to easily identify where resources are needed and to direct or redirect resources to where they are needed.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of operating an area reservation system, the method comprising:
  sending, by a server, for display on a user computing device, available parking spots in a selected parking lot;
  automatically reserving, by the server, a parking spot in the selected parking lot in response to receiving user input requesting reservation of one of the available parking spots;
  establishing, by the server, a geofence around the reserved parking spot;
  holding, by the server, the reserved parking spot for a predetermined period of time around a selected time of reservation for the parking spot; and
  sending a notification from the server to the user computing device in response to the user computing device entering the geofence of the reserved parking spot.

2. The method of claim 1, further comprising communicating, by the server, with an existing system for managing the selected parking lot to confirm when the vehicle enters and leaves the reserved parking spot.

3. The method of claim 1, further comprising generating, by the server, navigation direction to the reserved parking spot and sending the navigation direction for display and operation on the user computing device.

* * * * *